(12) United States Patent
Frey et al.

(10) Patent No.: US 11,660,766 B2
(45) Date of Patent: May 30, 2023

(54) HANDLING DEVICE

(71) Applicant: J.Schmalz GmbH, Glatten (DE)

(72) Inventors: Matthias Frey, Sulz-Dürrenmettstetten (DE); Simon Eisele, Glatten (DE); Florian Schittenhelm, Baiersbronn (DE); Bernd Heinzmann, Loßburg (DE); Jan Gauß, Freudenstadt (DE)

(73) Assignee: J.Schmalz GmbH, Glatten (DE)

( * ) Notice: Subject to any disclaimer, the term of this patent is extended or adjusted under 35 U.S.C. 154(b) by 331 days.

(21) Appl. No.: 17/132,027

(22) Filed: Dec. 23, 2020

(65) Prior Publication Data

US 2021/0213629 A1 Jul. 15, 2021

(30) Foreign Application Priority Data

Jan. 13, 2020 (DE) ...................... 10 2020 100 567.9

(51) Int. Cl.
| | |
|---|---|
| B25J 19/00 | (2006.01) |
| B25J 15/06 | (2006.01) |
| B25J 17/02 | (2006.01) |
| B25J 19/02 | (2006.01) |

(52) U.S. Cl.
CPC ....... *B25J 19/0041* (2013.01); *B25J 15/0625* (2013.01); *B25J 17/0241* (2013.01); *B25J 19/023* (2013.01)

(58) Field of Classification Search
CPC .......... B25J 15/0616; B25J 15/0625; B25J 15/0658; B25J 15/0441; B25J 15/0408; B25J 17/0241; B25J 19/0041; B25J 19/0231; B66C 1/0262

USPC .................................. 294/64.2, 186
See application file for complete search history.

(56) References Cited

U.S. PATENT DOCUMENTS

| | | | |
|---|---|---|---|
| 8,920,103 B2* | 12/2014 | Schaller ..................... | B25J 9/10 901/17 |
| 9,004,846 B2* | 4/2015 | La Rovere ........... | B25J 15/0616 414/737 |
| 9,974,235 B2* | 5/2018 | Van De Vegte ....... | A01G 18/00 |
| 10,682,770 B1* | 6/2020 | Lilliston, III ........ | B25J 17/0241 |

(Continued)

FOREIGN PATENT DOCUMENTS

| | | |
|---|---|---|
| DE | 102017009319 B3 | 4/2019 |
| DE | 102018114341 B3 | 10/2019 |

(Continued)

OTHER PUBLICATIONS

German Office Action, pp. 1-12, dated Nov. 25, 2020.

*Primary Examiner* — Dean J Kramer
(74) *Attorney, Agent, or Firm* — George McGuire

(57) ABSTRACT

The invention relates to a handling device for handling objects, including a base unit which extends overall in an elongate manner along a base axis from a first end to a second end, wherein a flange portion is arranged at the first end for fastening the handling device to a robot arm and wherein a pivot unit having a pivot portion is arranged at the second end, wherein the pivot portion is mounted so as to be pivotable about a pivot axis by a pivot joint, wherein the base unit has a pneumatic cylinder which is designed to pivot the pivot portion about the pivot axis, and including a couplable or coupled, pneumatically operated end effector for gripping an object.

17 Claims, 7 Drawing Sheets

(56) References Cited

U.S. PATENT DOCUMENTS

| | | | | |
|---|---|---|---|---|
| 2012/0061418 | A1* | 3/2012 | Ubidia | B65G 47/91 |
| | | | | 414/800 |
| 2014/0234066 | A1* | 8/2014 | Mathi | B65G 1/1376 |
| | | | | 414/751.1 |
| 2017/0120454 | A1* | 5/2017 | Ferguson | B25J 15/0061 |
| 2019/0255704 | A1* | 8/2019 | Johnson | B25J 9/1664 |
| 2019/0389082 | A1* | 12/2019 | Higo | B25J 19/023 |

FOREIGN PATENT DOCUMENTS

| | | |
|---|---|---|
| EP | 0008379 A1 | 3/1980 |
| WO | 2014040843 A1 | 3/2014 |
| WO | 2016029299 A1 | 3/2016 |

* cited by examiner

HANDLING DEVICE

CROSS REFERENCE TO RELATED APPLICATION

The present application relates and claims priority to German Patent Application No. 10 2020 100 567.9 filed Jan. 13, 2020, the entire contents of which is hereby incorporated by reference.

BACKGROUND

The invention relates to a handling device for handling objects.

Such handling devices are used, for example, when picking goods in warehouses, where they are used in particular to grip goods from a storage container having a plurality of goods (so-called "bin-picking") and, after gripping, to move the goods another location. In order to also be able to grip objects from corner areas of the storage container, such handling devices usually have an elongate base unit, at the end of which an end effector for gripping the object is arranged, e.g. a suction gripper that can be activated with negative pressure.

WO 2014/040843 A1 discloses a handling device having a longitudinal arm, at the first end of which a holding device is arranged for fastening the handling device to a robot arm, and at the second end of which an articulated arm is arranged which can be pivoted about a pivot axis via a pressure cylinder. The articulated arm is connected via a coupling means to suction bellows which can be supplied with negative pressure via an external negative-pressure supply line in order to suck up and grip the object. In order to pivot the articulated arm, the pressure cylinder can be supplied with compressed air via external positive-pressure supply lines. In such a set-up, the external negative- and positive-pressure supply lines form interfering contours and can be a hindrance when handling objects, which is particularly the case with "bin-picking." For example, objects can get caught in the supply lines and thus either are unintentionally gripped or tear the supply lines off. The external pressure cylinder may also become damaged when there is gripping into a container.

SUMMARY OF THE INVENTION

Based on this, the problem addressed by the present invention is that of making the handling of objects flexible and as trouble-free as possible.

This problem is solved by a handling device.

The handling device comprises a base unit which extends overall in an elongate manner, in particular in the manner of a rod, along a base axis from a first end to a second end. In addition, the handling device comprises a flange portion which is arranged at the first end of the base unit and is designed to connect the handling device to the robot arm.

The handling device also has a pneumatically activated end effector for gripping an object. It is conceivable for the end effector to be designed as a suction gripper for sucking up and gripping an object, for example. It is also conceivable for the end effector to be a pneumatically activated mechanical gripper, for example in the form of fluid-elastomer actuators.

When the handling device is operated as intended, the end effector is coupled to the pivot portion. In principle, a fixed installation of the end effector is conceivable. However, it can also be advantageous for the end effector to be detachably couplable to the pivot portion. For this purpose, the handling device can comprise a coupling means by means of which the end effector can be or is coupled to the pivot portion along a coupling axis. The coupling means is preferably designed in such a way that the end effector can be repeatedly coupled to and decoupled from the pivot portion.

The handling device also comprises a pivot unit which is arranged at the second end of the base unit. The pivot unit has a pivot portion and a pivot joint, the pivot portion being mounted so as to be pivotable about a pivot axis by means of the pivot joint. The pivot axis in particular does not extend in parallel with the base axis, but preferably extends perpendicularly to the base axis.

The base unit comprises a pneumatic cylinder (in the sense of a pneumatic drive) which interacts with the pivot unit in such a way that the pivot portion can be pivoted about the pivot axis by means of the pneumatic cylinder. In particular, the pneumatic cylinder comprises a piston which can be moved back and forth along a displacement axis.

The base unit also comprises an integrated negative-pressure generator for generating negative pressure. In particular, the negative-pressure generator is an ejector for generating negative pressure from compressed air.

The base unit is constructed as a structural unit with its own module housing, the module housing being designed to extend in an elongate manner along the base axis. In particular, the module housing is designed in such a way that the pneumatic cylinder and the negative-pressure generator are enclosed, in particular surrounded, by the module housing.

Such a handling device has particularly small interfering contours when gripping objects. Because the negative pressure required to operate the end effector can be generated in the handling device itself, it is in particular not necessary in such a handling device to supply the end effector with negative pressure via external pneumatic supply lines, in particular hoses. This prevents external supply lines from forming an interference contour when handling objects. In particular, such a handling device with an integrated negative-pressure generator does not require any externally supplied negative pressure at all, but only compressed air, which is easier to implement from a technical point of view. In the case of such a handling device, an interfering contour is also reduced by the base unit having a module housing which in particular encloses the pneumatic cylinder and the negative-pressure generator. In this way, the pneumatic cylinder and the negative-pressure generator are protected from environmental influences. In particular, the risk of objects getting caught on protrusions or recesses of the pneumatic cylinder or the negative-pressure generator and possibly damaging them in the process is minimized. Such a handling device is designed to be particularly robust, so that reliable functioning is ensured even after many gripping cycles in a storage container having a plurality of objects.

An advantageous shape with a small interfering contour is achieved, for example, if the module housing is designed to extend cylindrically around the base axis, i.e. has a circular outer contour when viewed in particular in cross section along the base axis. Preferably, a diameter of the module housing, viewed in cross section along the base axis, is smaller than a diameter of a robot arm to which the handling device is connected, or at least is not larger than this.

By pivoting the pivot portion about the pivot axis, it is possible to change an orientation of the end effector. This allows objects in different positions and locations to be gripped easily. This is particularly advantageous in "bin-picking," where goods regularly lie in the storage container in a disordered manner, i.e. with different orientations, and consequently the outer surface regions which are suitable for gripping of different objects are oriented differently. In this context, it is particularly advantageous if the pivot portion can be pivoted continuously about the pivot axis. In particular, a maximum pivot angle of the pivot portion is between 0° and 90° inclusive, in particular 30°, further in particular 45°.

The coupling means is designed in particular to detachably fasten the end effector to the pivot portion and, at the same time, to establish at least one fluid connection between the end effector and the pivot portion. In particular, the coupling means is designed such that the at least one fluid connection is formed when the end effector is fastened to the pivot portion. This allows the end effector to be changed easily. In particular, an end effector can be changed automatically in this way.

It is conceivable for the coupling means to comprise a magnetic connection which is effective between the end effector and the pivot portion. In particular, the magnetic connection comprises at least one magnetic element which is arranged on the pivot portion, and at least one counter magnetic element which interacts with the magnetic element to form a magnetic force and is arranged on the end effector. Then, only a linear relative movement between the end effector and the portion along the coupling axis is required to fasten the end effector to the pivot portion. The magnetic connection can be detached in a simple manner by tilting the end effector relative to the pivot portion. In this respect, only simple movement patterns are required for coupling or decoupling the end effector to or from the pivot portion, which favors an automatic end effector change. It is conceivable for the magnetic element and the counter magnetic element to be designed as permanent magnets. It is also conceivable for either the magnetic element or the counter magnetic element to be designed as a permanent magnet and for the other element to be made of a magnetizable material, for example a metal. It is also conceivable for the magnetic connection to comprise an electromagnet.

To supply the end effector with negative pressure, it is also preferred if an internal negative-pressure guide is provided. The negative-pressure duct is designed in particular to conduct negative pressure from the negative-pressure generator to the end effector. In particular, a portion of the negative-pressure guide extends in the module housing. It is particularly preferred if the negative-pressure guide is designed without a hose. This prevents hose connections from forming an interference contour when handling objects. In addition, saving on hose material results in a low weight of the handling device, which allows the use of lightweight robots with a comparatively low load capacity.

In order to ensure a supply of negative pressure to the end effector even during a pivoting movement of the pivot portion about the pivot axis, it is preferred if the negative-pressure guide extends through the pivot joint. In this respect, the negative-pressure guide is designed in particular in such a way that the negative pressure is guided through the pivot joint.

For this purpose, the pivot joint can comprise a hollow shaft which is in particular arranged concentrically around the pivot axis. The hollow shaft has in particular at least one first fluid opening and at least one second fluid opening, the first and the second fluid opening being fluidically interconnected. The at least one first fluid opening is in particular fluidically connected to a fluid channel of the base unit that leads to the negative-pressure generator. The at least one second fluid opening is fluidically connected in particular to a fluid channel on the pivot portion side. In particular, the at least one first fluid opening and the at least one second fluid opening are designed and arranged in such a way that a fluid connection is established in each case when the pivot portion is pivoted about the pivot axis.

In the context of an advantageous embodiment, the pivot unit is designed as a modular structural unit provided separately from the base unit. The pivot unit then comprises in particular a connection portion which can be connected (in particular can be detachably connected and in particular can be reconnected) to the module housing of the base unit and on which the pivot portion is pivotally mounted via the pivot joint. In order to transmit negative or positive pressure between the base unit and the pivot unit, the connection portion preferably comprises at least one fluid interface which is designed to be connected to a fluid interface arranged on the module housing of the base unit. The fluid interfaces are preferably designed and arranged in such a way that they form a fluid connection when the pivot unit is fastened to the base unit. The fluid interface of the connection portion is preferably fluidically connected to the first fluid opening of the hollow shaft.

To supply the handling device with negative and/or positive pressure, it is also preferred if the flange portion has at least one pneumatic supply connection for connection to an external fluid supply (negative or positive pressure). The at least one pneumatic supply connection is preferably arranged on an end face of the flange portion, via which the flange portion can be connected to a tool flange of a robot arm. The at least one pneumatic supply connection is then designed in particular to be connected to a fluid interface of the tool flange of the robot arm. In such an embodiment, the handling device is supplied with negative and/or positive pressure from "above" so that no external hoses are required in the region of the rod-like base unit. Interfering contours can be further reduced in this way. In particular, the flange portion comprises at least one positive-pressure supply connection which is fluidically connected to the negative-pressure generator via a positive-pressure channel enclosed in the module housing. Furthermore, it is preferred if the flange portion has at least one positive-pressure supply connection which is fluidically connected to the pneumatic cylinder via a positive-pressure channel enclosed in the module housing.

In addition, it is particularly advantageous if the flange portion has at least one positive-pressure supply connection which is connected to a positive-pressure duct for supplying the end effector with positive pressure. The positive-pressure duct is designed in particular to conduct positive pressure from at least one positive-pressure supply connection of the flange portion to the end effector. The positive-pressure duct is preferably enclosed in the module housing and extends in particular over the full length of the module housing from the first end to the second end. Such an embodiment makes it possible, on the one hand, to use end effectors that can be operated with positive pressure (for example mechanical gripping fingers that can be displaced with positive pressure). In addition, such an embodiment makes it possible to quickly ventilate an end effector designed as a suction gripper and to blow off an object that has been sucked up.

In this context, it is particularly preferred if the coupling means is designed to establish both a negative-pressure fluid connection and a positive-pressure fluid connection between the end effector and the pivot portion when the end effector is coupled to the pivot portion. According to an advantageous embodiment, the pivot portion has a negative-pressure outlet and a positive-pressure outlet on a coupling side and the end effector optionally has a negative-pressure inlet and/or a negative-pressure inlet on a corresponding counter coupling side. It is conceivable for the end effector to have only one negative-pressure inlet or only one positive-pressure inlet. The end effector can then be designed in particular in such a way that the relevant other outlet on the coupling side of the pivot portion is sealed in the coupled state. In this respect, either negative or positive pressure can be tapped (modular system). It is also conceivable for the end effector to have both a negative-pressure inlet and a positive-pressure inlet. This makes it possible, for example if the end effector is designed as a suction gripper, to first suck up an object via the negative-pressure inlet and then to blow it off by means of positive pressure. For example, it is conceivable for the end effector to comprise a coupling adapter for coupling to the pivot portion. In particular, the coupling adapter is designed in such a way that different interchangeable inserts with either a negative-pressure inlet and/or a positive-pressure inlet can be inserted into the coupling adapter.

Preferably, the at least one negative-pressure outlet and the at least one negative-pressure inlet or the at least one positive-pressure outlet and the at least one positive-pressure inlet are designed and arranged relative to one another in such a way that the at least one negative-pressure outlet and the at least one negative-pressure inlet or the at least one positive-pressure outlet and the at least one positive-pressure inlet form a fluid connection when the end effector is fastened to the pivot portion, and this connection is separated again upon decoupling. This favors an automatic end effector change.

Sealing elements, for example in the form of O-rings or foam seals, can be provided to seal off a relevant fluid connection between the positive-pressure outlet and the positive-pressure inlet or the negative-pressure outlet and the negative-pressure inlet.

In a particularly advantageous embodiment of the handling device, the coupling means is designed in such a way that it is effective for coupling the end effector in several predetermined rotational orientations of the end effector about the coupling axis relative to the pivot portion, but in particular in every rotational orientation of the end effector about the coupling axis. In this respect, the coupling means is designed in particular such that the end effector can be fastened to the pivot portion in several predetermined rotational orientations and, at the same time, a negative-pressure fluid connection and/or a positive-pressure fluid connection between the end effector and the pivot portion can be formed in these rotational orientations. This makes it possible to arrange the end effector in different rotational orientations on the pivot portion and to supply it with negative and/or positive pressure.

In order to fasten the end effector to the pivot portion, the coupling means can comprise a magnetic connection described above, for example. In order to allow the end effector to be fastened to the pivot portion in different rotational orientations, it is particularly preferred if the at least one magnetic element and/or the at least one counter magnetic element is designed to extend around the coupling axis in the manner of a ring or ring portion.

In order to be able to form a fluid connection between the end effector and the pivot portion in different rotational orientations of the end effector, it is also preferred if the at least one negative-pressure outlet and/or the at least one negative-pressure inlet or the at least one positive-pressure outlet and/or the at least one positive-pressure inlet each open out with an opening cross section in the coupling side of the pivot portion or in the counter coupling side of the end effector, the opening cross section being extended rotationally symmetrically around the coupling axis, in particular in the manner of a ring or ring portion. In particular, the at least one negative-pressure outlet and the at least one positive-pressure outlet are arranged concentrically around the coupling axis. It is particularly preferred here if the positive-pressure outlet is designed to extend around the coupling axis in the manner of a circle and if the negative-pressure outlet, which is radially spaced apart from the negative-pressure outlet, is designed to extend around the coupling axis in the manner of a ring. The negative-pressure outlet then has a comparatively large opening cross section, so that a high volume flow can pass through. If the end effector is designed as a suction gripper, this makes it possible to securely suck up an object even in case of a leak. If the coupling means is designed with a magnetic connection, the at least one magnetic element is then designed in particular in such a way that it extends around the coupling axis in the manner of a ring or ring portion and is arranged in particular between the negative-pressure outlet and the positive-pressure outlet.

In order to prevent undesired rotation of the end effector about the coupling axis relative to the pivot portion, it is also preferred if an anti-rotation means is provided which is effective between the pivot portion and the end effector and which is designed to prevent rotation about the coupling axis.

The anti-rotation means preferably comprises a first anti-rotation portion which is arranged on the pivoting portion and a second anti-rotation portion which is arranged on the end effector. In particular, the first anti-rotation portion and the second anti-rotation portion are designed such that they interact with one another in a form-fitting manner when the end effector is coupled to the pivot portion, viewed in the direction of rotation about the coupling axis. For this purpose, the first anti-rotation portion or the second anti-rotation portion can have a plurality of recesses, for example in the form of local recesses, which are arranged so as to be offset from one another along a circumference around the coupling axis. The second or the first anti-rotation portion can then have at least one protrusion, in particular a plurality of protrusions, the at least one protrusion being arranged in such a way that—to define a rotational orientation of the end effector about the coupling axis relative to the pivot portion—it can optionally be arranged in different recesses. The recesses are preferably arranged so as to be uniformly distributed along a circumference around the coupling axis.

Furthermore, it can be advantageous if the base unit comprises a ventilation valve which is fluidically connected to the end effector. This makes it possible, for example if the end effector is designed as a suction gripper, to ventilate it quickly and thus quickly place an object that has been sucked up.

It can also be advantageous if the base unit comprises a valve means which is designed to control a supply of negative pressure or positive pressure to the handling device. The flange portion can then optionally also have an electrical interface for controlling the valve means. In particular, the valve means is designed to control a supply of positive pressure to the pneumatic cylinder, and thus to control a pivoting movement of the pivot portion about the pivot axis. In particular, the valve means is arranged in the module housing, and is preferably surrounded by the module housing.

It is also conceivable for the handling means to comprise a valve module which is provided separately from the base unit and can be arranged between the flange portion and the robot arm. In particular, the valve module is designed to control a supply of negative pressure or positive pressure to the handling device, in particular to monitor positive-pressure values and/or negative-pressure values.

In the context of an advantageous embodiment, the handling device can also comprise a camera module with at least one camera which is designed to identify the position and location of an object to be gripped, in particular the position and location of an outer surface of the object. This makes it possible, before the end effector approaches an object, to characterize the object, in particular to identify a gripping position on the object. The camera module is preferably arranged on the base unit or on the flange portion. In particular, the camera module is held by a holding means on an outer side of the module housing or of the flange portion. In order to ensure a clear view of a gripping region, it can be advantageous here if the at least one camera is held in a position that is radially spaced apart from the outside of the module housing.

BRIEF DESCRIPTION OF THE DRAWINGS

The invention will be explained in more detail in the following with reference to the drawings, in which.

DETAILED DESCRIPTION

Figure 1:
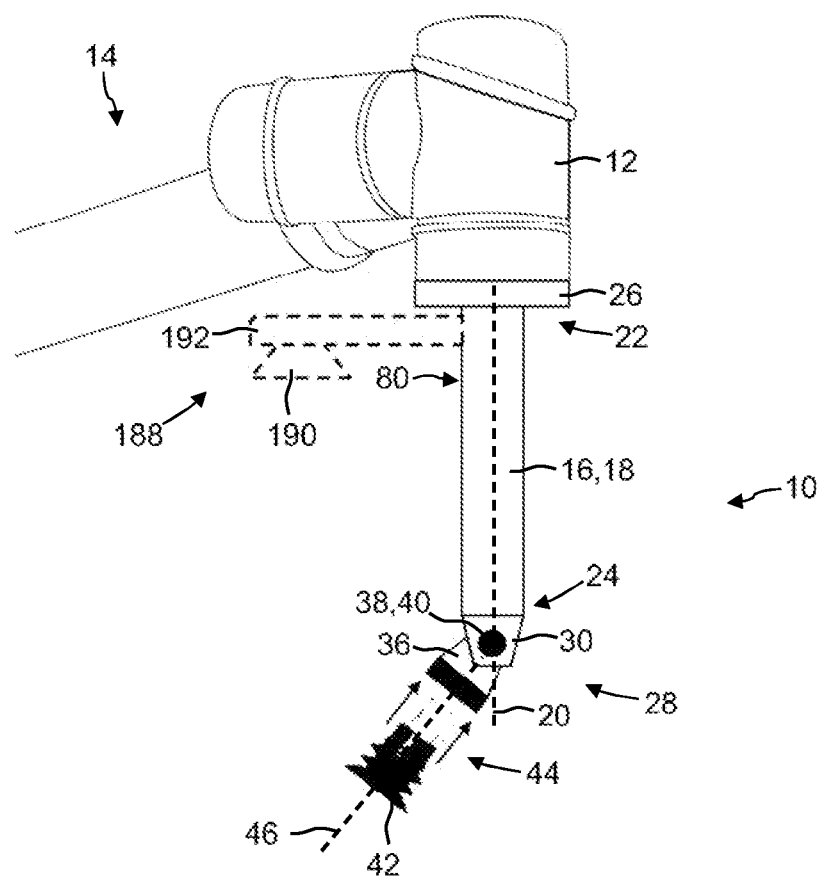
FIG. 1 is a simplified schematic view of an embodiment of the handling device in the fastened state on a robot arm.

In the following description and in the drawings, the same reference signs are used for identical or corresponding features.

FIG. 1 shows a handling device 10 for gripping and handling objects (not shown). As shown schematically in FIG. 1, the handling device 10 is designed in particular to be connected to a robot arm 12 of a robot 14 and to be maneuvered by same.

The handling device 10 comprises a base unit 16 which extends with a module housing 18 in the manner of a rod along a base axis 20 between a first end 22 and a second end 24. By way of example and preferably, the module housing 18 is designed as a circular cylinder.

The handling device 10 further comprises a flange portion 26 which is arranged at the first end 22 of the base unit 16 and is designed to connect the handling device 10 to the robot arm 12. For this purpose, the flange portion 26 can comprise, in a manner known per se, corresponding fastening means (not shown) for connecting the flange portion 26 to a tool flange of the robot arm 12.

The handling device 10 also comprises a pivot unit 28, preferably provided separately from the base unit 16, which is arranged at the second end 24 of the base unit 16. The pivot unit 28 comprises a connection portion 30 which can be detachably connected to an end face 32 of the module housing 18, by way of example and preferably via a correspondingly designed screw connection 34 (cf. FIGS. 5 and 6). The pivot unit 28 also comprises a pivot portion 36 which is mounted on the connection portion 30 via a pivot joint 38 such that it can be pivoted about a pivot axis 40. The pivot axis 40 is oriented here by way of example, preferably orthogonally to the base axis 20 (cf. FIGS. 1 and 3).

The handling device 10 also comprises a pneumatically operated end effector 42 for gripping an object (described in detail below). In the example shown, the end effector 42 is designed as a suction gripper for sucking up an object. However, in embodiments not shown, the end effector 42 can also be designed as a pneumatically operated mechanical gripper.

As will be explained in more detail below, the end effector 42 can be coupled to the pivot portion 36 along a coupling axis 46 via a coupling means 44. In the coupled state, an orientation of the end effector 42 can then be changed by means of a pivoting movement of the pivot portion 36 about the pivot axis 40.

Figure 2:
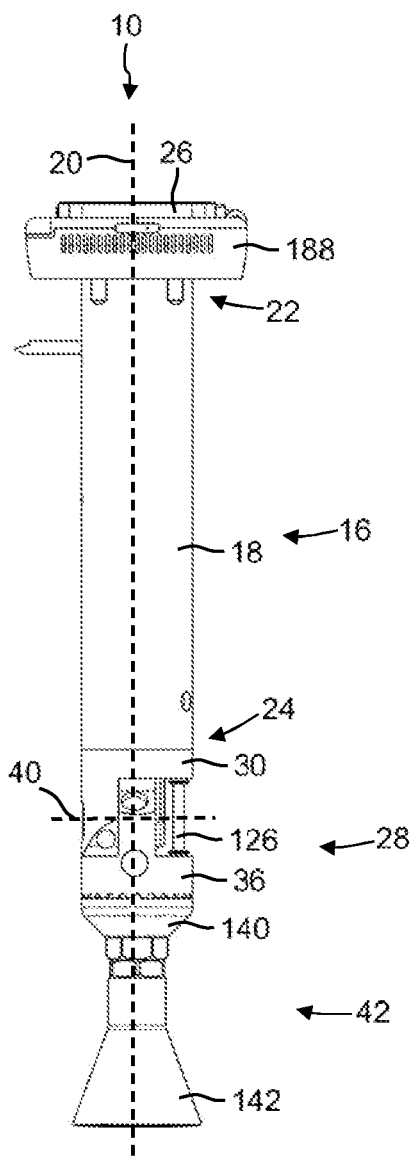
FIG. 2 is an outline of an embodiment of the handling device with a pivot portion in an initial configuration in a front view.

As can be seen for example from FIG. 2, the connection portion 30 of the pivot unit 28 and the module housing 18 of the base unit 16, viewed in cross section along the base axis 20, have the same, preferably circular, shape and area. In this respect, the connection portion 30 and the module housing 18 form a common outer contour in the connected state.

In a coupling region 48 to which the end effector 42 can be coupled, the pivot portion 36 preferably also has a cylindrical outer shape (cf. FIG. 6), so that the module housing 18, the connection portion 30 and the pivot portion 36 form an overall rod-like outer shape in an initial configuration shown in FIG. 2.

Figure 3:
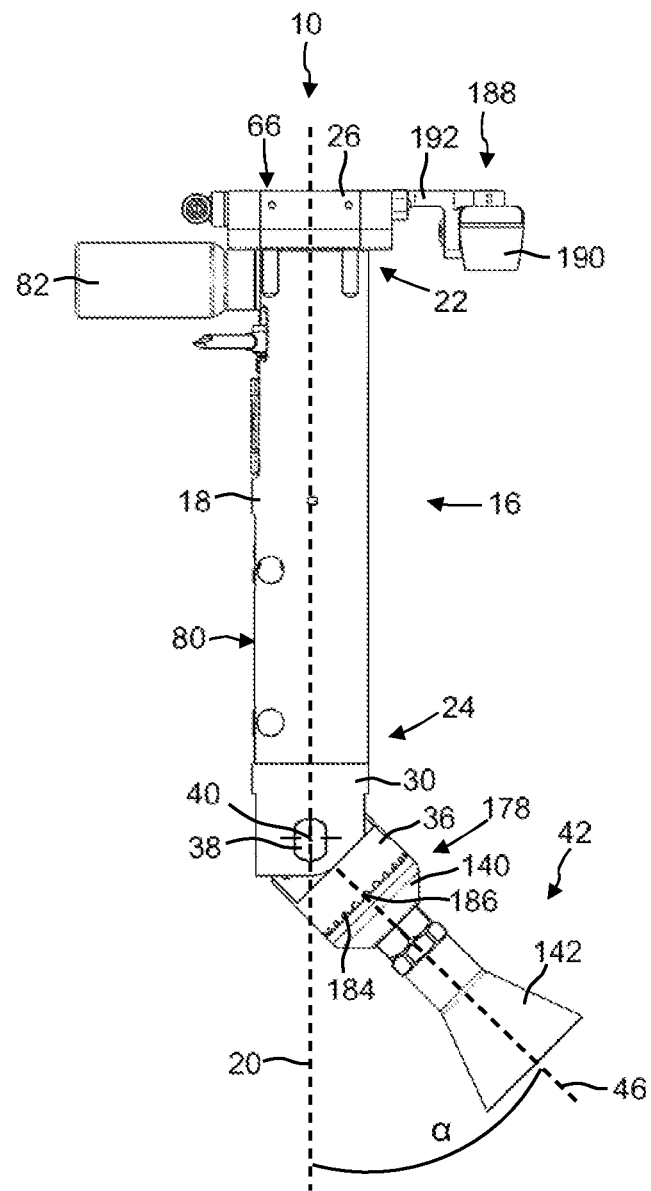
FIG. 3 is an outline of the handling device according to FIG. 2 with a pivot portion in a pivot configuration in a side view.

Starting from this initial configuration, the pivot portion 36 can be converted into a pivot configuration shown in FIG. 3, in which the pivot portion 36 is pivoted by a pivot angle α about the pivot axis 40 relative to the base unit 16. A maximum pivot angle α is preferably between 0° and 90°, in particular 30°, further in particular 45°.

Figure 4:
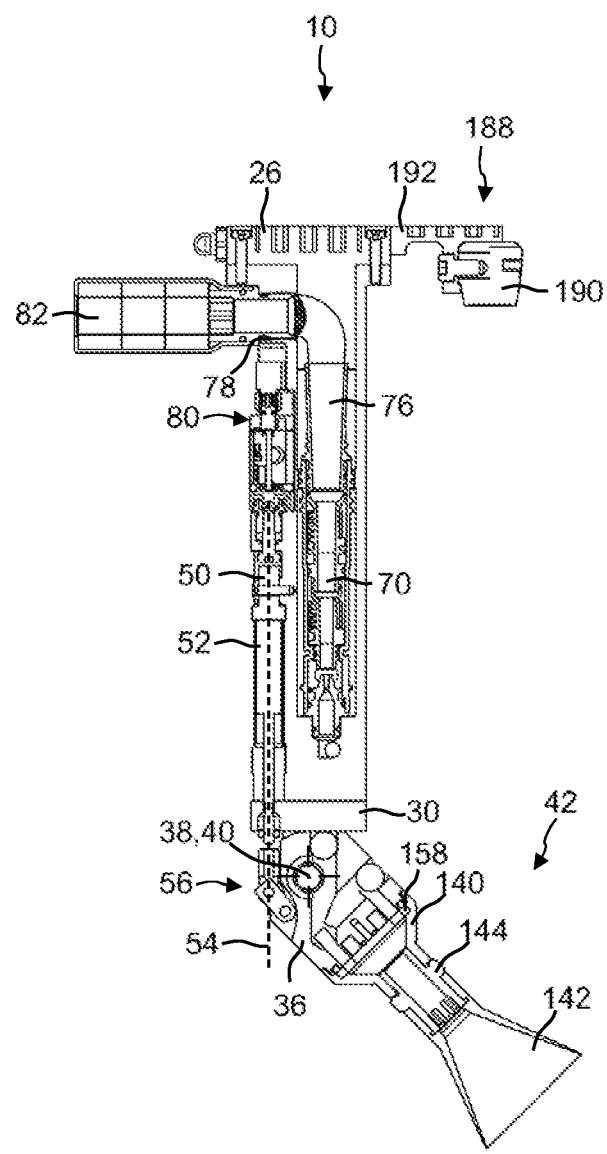
FIG. 4 is an outline of the handling device according to FIG. 3 in a vertical section.

In order to actuate a pivot movement of the pivot portion 36 about the pivot axis 40, the handling system 10 comprises a pneumatic cylinder 50 that can be operated with compressed air. As can be seen from FIGS. 4 and 5, the pneumatic cylinder 50 is enclosed in the module housing 18 of the base unit 16. The pneumatic cylinder 50 has a piston 52 which can be moved back and forth along a displacement axis 54 (cf. FIG. 4). The pneumatic cylinder 50 is oriented in such a way that the displacement axis 54 extends in parallel with the base axis 20. As can be seen from FIG. 4, the piston 52 is mechanically coupled to the pivot portion 36 via a joint means 56 in such a way that a movement of the piston 52 along the displacement axis 54 leads to a pivoting movement of the pivot portion 36 about the pivot axis 40.

In order to move the piston 52 back and forth along the displacement axis 54, the pneumatic cylinder 50 can be supplied with compressed air via two positive-pressure channels 58, 60. As can be seen from FIG. 5, the positive-pressure channels 58, 60 are enclosed in the module housing 18 of the base unit 16 and each open into a corresponding positive-pressure supply connection 62, 64 on the flange portion 26. By way of example and preferably, the positive-pressure supply connections 62, 64 are arranged on an end face 66 of the flange portion 26, by means of which end face 66 the flange portion 26 can be connected to the robot arm 12. In this respect, the positive-pressure supply connections 62, 64 are preferably designed to be connected to a positive-pressure interface of a tool flange (not shown) of the robot arm 12.

Figure 5:
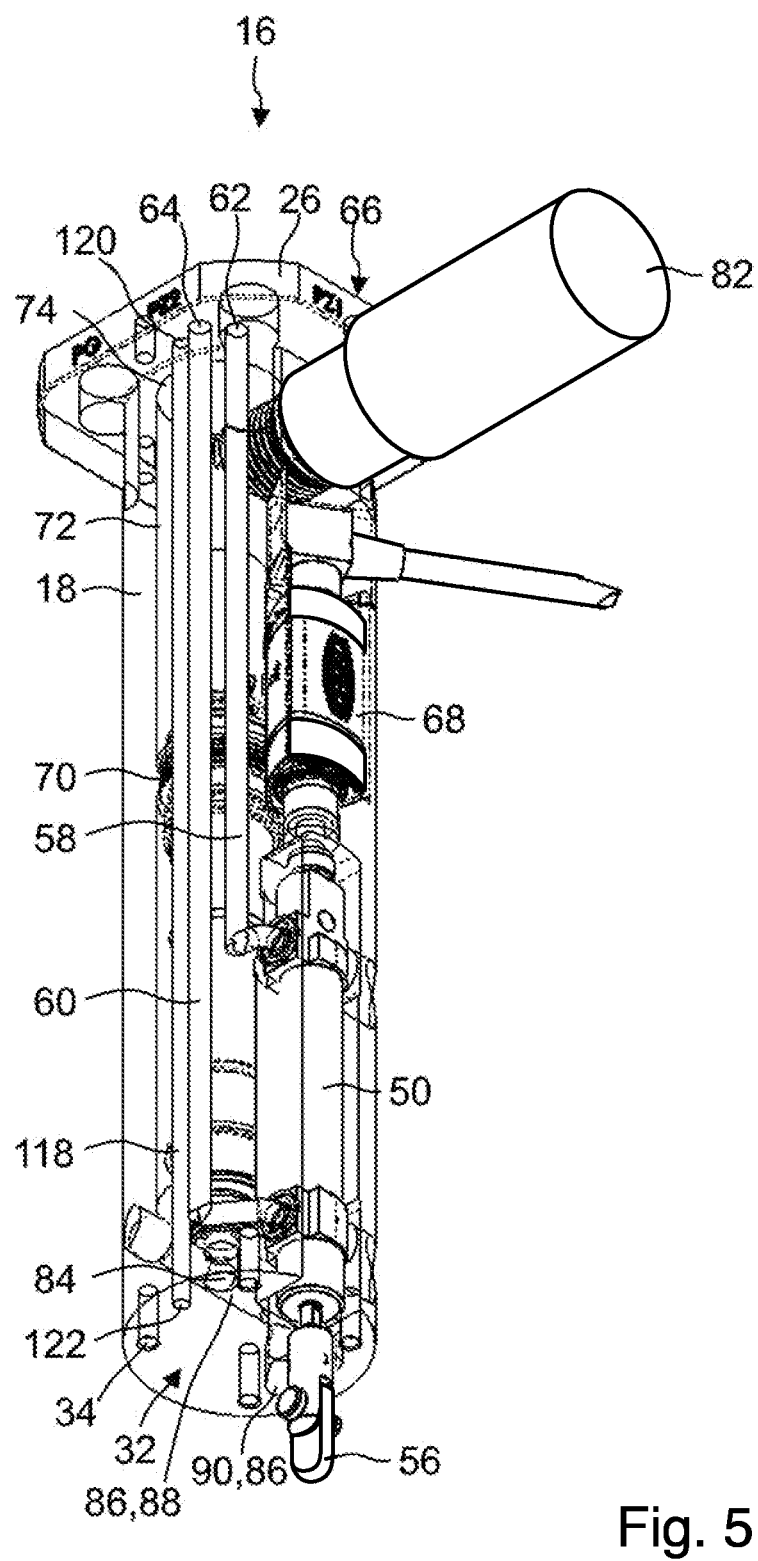
FIG. 5 is an outline of a base unit of the handling device according to FIG. 2 in a perspective view.
Figure 6:
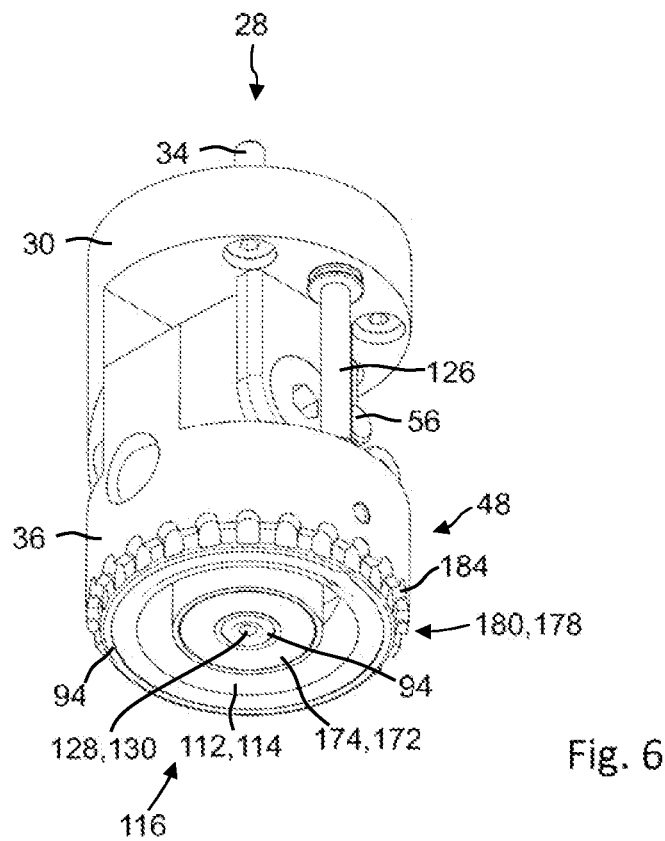
FIG. 6 is an outline of a pivot unit of the handling device according to FIG. 2 in a perspective view.

To control the pneumatic cylinder 50, in particular to control a movement of the piston 52 along the displacement axis 54, the base unit 16 can also have a valve means 68 which is preferably also arranged in the module housing 18 (cf. FIG. 5).

The base unit 16 also comprises a negative-pressure generator 70 which is designed to generate negative pressure from compressed air. As can be seen from FIGS. 4 and 5, the negative-pressure generator 70 is arranged in the module housing 18 and preferably surrounded by it. The negative-pressure generator 70 can be supplied with compressed air via a positive-pressure channel 72 (cf. FIG. 5). The positive-pressure channel 72 opens into a corresponding positive-pressure supply connection 74 on the end face 66 of the flange portion 26. The negative-pressure supply connection 74 is preferably designed to be connected to an external compressed air supply (not shown), in particular a compressed air interface of the tool flange of the robot arm 12.

The negative-pressure generator 70 also has a positive-pressure output 76 for outputting compressed air. The positive-pressure output 76 opens into a positive-pressure outlet 78 on a lateral surface 80 of the module housing 18 (cf. FIG. 4). By way of example and preferably, the positive-pressure outlet 78 is fitted with a silencer 82.

The negative-pressure generator 70 also has a negative-pressure outlet 84 (suction inlet) which is fluidically connected to a negative-pressure guide 86 for guiding negative pressure from the negative-pressure generator 70 to the end effector 42 (cf. FIG. 5). By way of example and preferably, the negative-pressure guide 86 is designed without a hose. The negative-pressure guide 86 comprises a first fluid channel 88 which is enclosed by the module housing 18 of the base unit 16 and opens at the second end 24 of the base unit 16 into a negative-pressure fluid interface 90 arranged on the end face 32 of the module housing 18 (cf. FIG. 5). This negative-pressure fluid interface 90 can be fluidically connected to a corresponding negative-pressure fluid interface 92 of the connection portion 30 of the pivot unit 28 (cf. FIG. 7), so that negative pressure can be conducted from the base unit 16 to the pivot unit 28. The negative-pressure fluid interfaces 90, 92 are preferably designed in such a way that they establish a fluid connection when the pivot unit 28 is fastened to the module housing 18 by means of the screw connection 34. As can be seen from FIG. 7, corresponding sealing elements 94, for example in the form of O-rings, can be provided to seal off the fluid connection.

In order to be able to supply the end effector 42 with negative pressure even during a pivoting movement about the pivot axis 40, the negative-pressure guide 86 preferably extends through the pivot joint 38. For this purpose, the pivot joint 38 comprises a hollow shaft 96 with a hollow shaft wall 98 which delimits an inner cavity 100 of the hollow shaft 96 (cf. FIG. 7). The hollow shaft 96 is arranged concentrically around the pivot axis 40 and is preferably connected to the connection portion 30 for conjoint rotation. In contrast, the pivot portion 36 is mounted on the hollow shaft 96 so as to be pivotable about the pivot axis 40. The hollow shaft 96 has a plurality of first fluid openings 102 which are designed for example as bores 104 that pass through the hollow shaft wall 98 in the radial direction and are preferably arranged so as to be distributed along a circumference around the hollow shaft 96. As can be seen from FIG. 7, the first fluid openings 102 are fluidically connected to the negative-pressure fluid interface 92 of the connection portion 30 via a fluid channel 106, so that the cavity 100 of the hollow shaft 96 can be supplied with negative pressure.

The hollow shaft 96 also has a plurality of second fluid openings 108 which are arranged so as to be axially spaced apart from the first fluid openings 102, but are otherwise designed analogously to the first fluid openings 102. The second fluid openings 108 are fluidically connected to a negative-pressure fluid channel 110 on the pivot portion side, so that negative pressure can be supplied thereto. Because the first and second fluid openings 102, 108 are arranged so as to be distributed along a circumference around the hollow shaft 96, negative pressure can be supplied to the negative-pressure fluid channel 110 on the pivot portion side even when the pivot portion 36 pivots about the pivot axis 40.

The negative-pressure fluid channel 110 on the pivot portion side is fluidically connected to a negative-pressure outlet 112 which opens out with an opening cross section 114 in a coupling side 116 of the pivot portion 36, at which coupling side 116 the end effector 42 can be coupled to the pivot portion 36. As can be seen from FIG. 6, the opening cross section 114 of the negative-pressure outlet 112 is ring-shaped and extended concentrically around the coupling axis 40.

In the example shown, the handling device 10 further comprises a positive-pressure duct 118 which is designed to conduct positive pressure from a positive-pressure supply connection 120 of the flange portion 26 to the end effector 42 (cf. FIG. 5). As can be seen from FIG. 5, the positive-pressure duct 118 is enclosed in the module housing 18 of the base unit 16 and passes through the module housing 18 from the first end 22 to the second end 24. The positive-pressure duct 118 opens at the first end 22 into the positive-pressure supply connection 120 of the flange portion 26. At the second end 24 of the base unit 16, the positive-pressure duct 118 opens into a positive-pressure fluid interface 122 on the end face 32 of the module housing 18.

Figure 7:
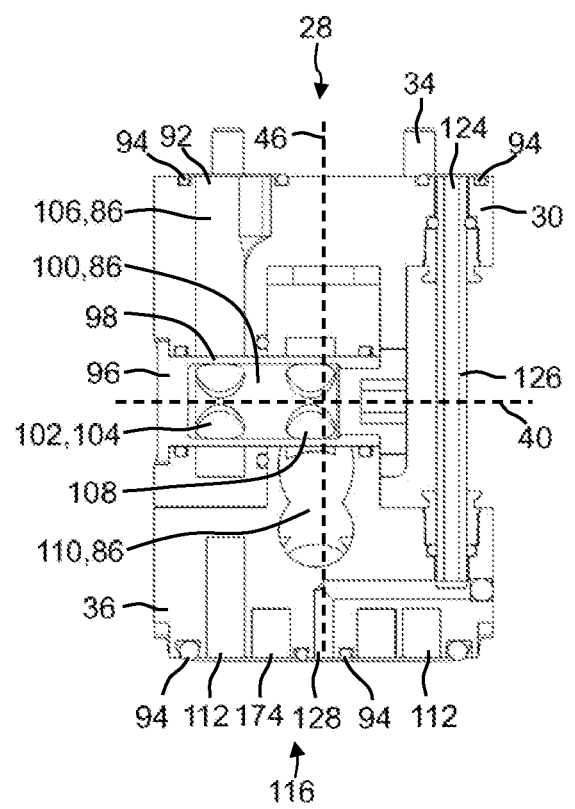
FIG. 7 is an outline of the pivot unit according to FIG. 7 in a sectional view.

The positive-pressure fluid interface 122 of the module housing 18 can be fluidically connected to a corresponding positive-pressure fluid interface 124 of the connection portion 30 of the pivot unit 28 (cf. FIG. 7). Analogously to the negative-pressure fluid interfaces 90, 92 explained above, the positive-pressure fluid interfaces 122, 124 are also preferably designed such that they establish a fluid connection when the connection portion 30 is fastened to the module housing 18 by means of the screw connection 34. As can be seen from FIG. 7, corresponding sealing elements 94, for example in the form of O-rings, can be provided to seal off the fluid connection.

The positive-pressure fluid interface 124 of the connection portion 30 is connected via a hose connection 126 to a positive-pressure outlet 128 on the pivot portion side (cf. FIG. 7). As can be seen from FIG. 7, the positive-pressure outlet 128 opens with an opening cross section 130 centrally into the coupling side 116 of the pivot portion 36. The opening cross section 130 of the positive-pressure outlet 128 extends circularly and concentrically around the coupling axis 46.

As already explained above, the end effector 42 can be coupled to the pivot portion 30 by means of a coupling means 44. The coupling means 44 is designed on the one hand to detachably fasten the end effector 42 to the pivot portion 36. In addition, the coupling means 44 is designed to establish a negative-pressure fluid connection and/or a positive-pressure fluid connection between the end effector 42 and the pivot portion 36 when the end effector 42 is fastened to the pivot portion 36. For this purpose, as will be explained in detail below, the end effector 42 optionally has, on a counter coupling side 132 which interacts with the coupling side 116 of the pivot portion 36, a negative-pressure inlet 134 for connection to the negative-pressure outlet 112 of the pivot portion 36 and/or a positive-pressure inlet 136 for connection to the positive-pressure outlet 128 of the pivot portion 36.

Figure 8:
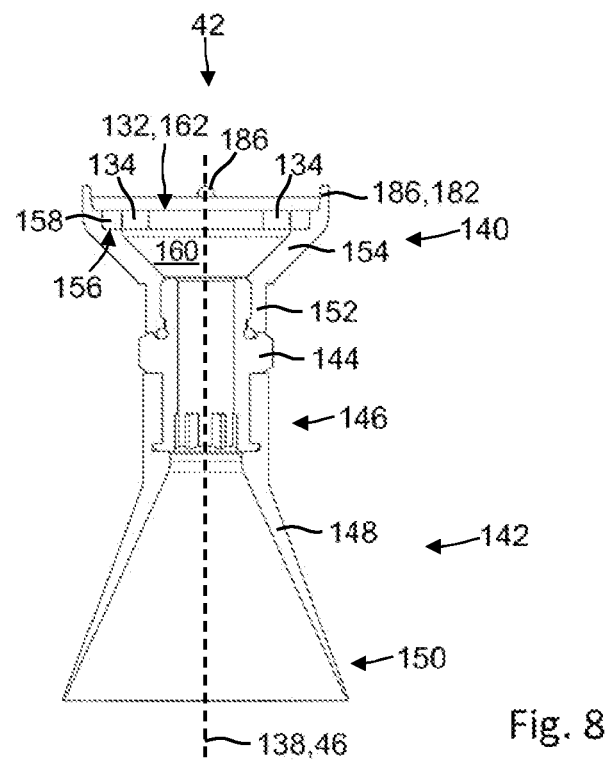
FIG. 8 is an outline of an embodiment of an end effector of the handling device.

As can be seen from FIG. 8, the end effector 42 extends substantially along a central axis 138, which corresponds to the coupling axis 46 when the end effector 42 is coupled to the pivot portion 36. The end effector 42 has a coupling adapter 140 by means of which the end effector 42 can be connected to the pivot portion 36.

In the example shown, the end effector 42 is designed as a suction gripper comprising a suction body 142 which is connected to the coupling adapter 140 via an intermediate adapter 144. In the example shown, the suction body 142 has a connection nipple 146 via which the suction body 142 is connected to the intermediate adapter 144 and via which the suction body 142 can be supplied with negative pressure. The suction body 142 also has a suction body wall 148 which extends away from the connection nipple 146 and opens into a contact portion 150 for contact with an object to be gripped.

As can be seen from FIG. 8, the suction body wall 148 widens in the manner of a funnel in the direction from the connection nipple 146 to the contact portion 150, with a material thickness of the suction body wall 148 decreasing in the course from the connection nipple 146 to the contact portion 150. Such a suction body 142 can therefore cling particularly well to the outer surface of an object to be gripped with its thin-walled and thus flexible contact portion 150; at the same time, the wall portions with greater material thickness ensure adequate dimensional stability of the suction body 142.

In embodiments not shown, the end effector 42 can also be designed as a pneumatically operated mechanical gripper. The end effector 42 can then have, for example, a fluid-elastomer actuator which is connected to the coupling adapter 140 via a correspondingly designed intermediate adapter. In this respect, the coupling adapter 140 can preferably be used universally.

The coupling adapter 140 has a cylindrical connection portion 152 via which the coupling adapter 140 is connected to the intermediate adapter 144. The coupling adapter 140 also has a wall 154 which, widening in the manner of a funnel, extends away from the connection portion 152 and opens into a receiving portion 156 for receiving an interchangeable insert 158, which will be described in detail below. The wall 154 delimits a fluid chamber 160 via which negative pressure and/or positive pressure can be conducted to the intermediate adapter 144 and further to the suction body 142.

The interchangeable insert 158 is designed, by way of example and preferably, in the shape of a disk, with a cover surface 162 of the interchangeable insert 158 forming the counter coupling side 132. The interchangeable insert 158 is preferably rigidly connected to the coupling adapter 140, for example pressed in. The interchangeable insert 158 can be designed differently depending on the design of the end effector 42.

Figure 9A:
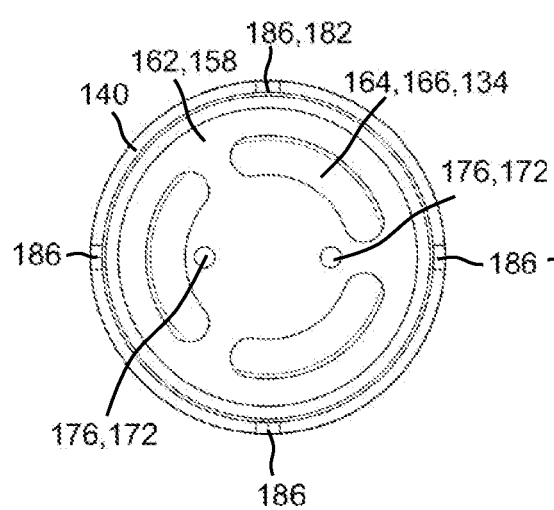
FIG. 9a, 9b are outlines of a coupling adapter of the end effector according to FIG. 8 in a negative-pressure configuration (view a) and in a positive-pressure configuration (view b), each in plan view.

FIG. 9a shows an embodiment of the coupling adapter 140 with an interchangeable insert 158 in a negative-pressure configuration, as is used, for example, in the end effector according to FIG. 8. In the negative-pressure configuration, the interchangeable insert 158 has a plurality of apertures 164 which pass through the interchangeable insert 158 and open into the cover surface 162 with an opening cross section 166 in the form of a ring portion. The apertures 164 are arranged and designed such that, when the end effector 42 is fastened to the pivot portion 36, they interact with the ring-shaped negative-pressure outlet 112 of the pivot portion 36 to form a negative-pressure fluid connection. To this extent, the ring-portion-shaped recesses 164 form the negative-pressure inlet 134 of the end effector 42. Corresponding sealing elements 94, for example in the form of O-rings, can be provided to seal off the negative-pressure fluid connection (cf. FIG. 7). However, in the negative-pressure configuration as shown in FIG. 9a, no openings are provided in a region of the interchangeable insert 158 corresponding to the positive-pressure outlet 128 of the pivot portion 36, so that the positive-pressure outlet 128 is sealed off from the cover surface 162 of the interchangeable insert 158 when the end effector 42 is fastened to the pivot portion 36.

Figure 9B:
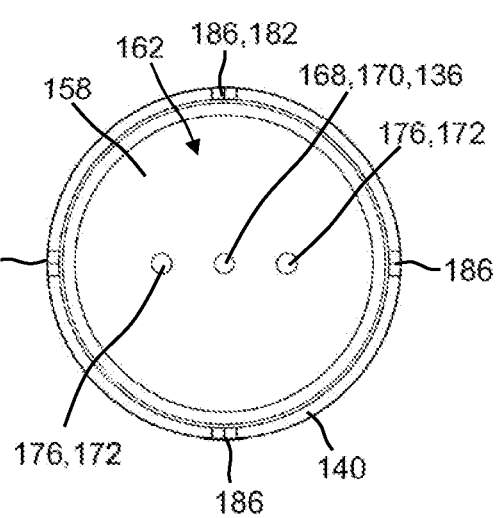

FIG. 9b shows the interchangeable insert 158 in a positive-pressure configuration. In such an embodiment, the interchangeable insert 158 has a central aperture 168 which passes through the interchangeable insert 158 and opens out with a circular opening cross section 170 into the cover surface 162 of the interchangeable insert 158. The aperture 168 is arranged such that—when the end effector 42 is fastened to the pivot portion 36—it interacts with the positive-pressure outlet 128 of the pivot portion 36 to form a positive-pressure fluid connection. To this extent, the aperture 168 forms the positive-pressure inlet 136 of the end effector 42. Corresponding sealing elements 94, for example in the form of O-rings, can be provided to seal off the positive-pressure fluid connection (cf. FIG. 7). In the region of the negative-pressure outlet 112 of the pivot portion 36, however, the interchangeable insert 158 in the positive-pressure configuration as shown in FIG. 9b has no openings, so that the negative-pressure outlet 112 is sealed off from the cover surface 162 of the interchangeable insert 158 when the end effector 42 is fastened to the pivot portion 36.

In embodiments not shown, the interchangeable insert 158 can also have both a negative-pressure inlet 134 and a positive-pressure inlet 136. Then, for example, an object can first be sucked up using negative pressure and then blown off using positive pressure.

In order to fasten the end effector 42 to the pivot portion 36, the coupling means 44 has a magnetic connection 172 in the example shown. The magnetic connection 172 comprises a magnetic element 174 which is arranged on the coupling side 116 of the pivot portion 36 and extends in the manner of a ring around the coupling axis 46. As can be seen from FIG. 7, the magnetic element 174 in the example shown is arranged between the positive-pressure outlet 128 and the negative-pressure outlet 112. In the example shown, the magnetic connection 172 further comprises two counter magnetic elements 176 which are arranged on the interchangeable insert 158 of the end effector 42 and interact with the magnetic element 174 to form a magnetic force. It is conceivable that both the magnetic element 174 and the counter magnetic element 176 are formed by a permanent magnet. It is also conceivable that either the magnetic element 174 or the counter magnetic element 176 is formed by a permanent magnet and the other element in each case is formed from a magnetizable material, for example a metal.

In order to be able to fix the end effector 42 in a predetermined rotational orientation about the coupling axis 46, an anti-rotation means 178 is also provided, which is effective between the pivot portion 36 and the end effector 42. The anti-rotation means 178 comprises a first anti-rotation portion 180 which is arranged on the pivot portion 36, and a second anti-rotation portion 182 which is arranged on the end effector 42. The first anti-rotation portion 180 comprises a plurality of recesses 184 which are arranged so as to be offset from one another at an angle of 15° along a circumference around the coupling axis. In the example shown, the recesses 184 are formed by local recesses on an outer surface of the pivot portion 36. The second anti-rotation portion 182 comprises a plurality of protrusions 186 which are designed and arranged in such a way that—to define a rotational orientation of the end effector 42 around the coupling axis 46—they can optionally be arranged in different recesses 184 (cf. FIG. 3). In the example shown, the protrusions 186 are formed by corresponding wall protrusions of the wall 154 of the coupling adapter 140 of the end effector 42 (cf. FIGS. 8 and 9).

Optionally, the handling means 10 can further comprise a camera module 188 with a camera 190 which is designed to identify the position and location of an object to be gripped (cf. FIG. 1). The camera 190 can be connected to the lateral surface 80 of the module housing 18 of the base unit 16 (cf. FIG. 1) or the flange portion 26 (cf. FIG. 3) via a holding means 192, for example. The camera 190 is preferably arranged at a distance from the module housing 18, radially with respect to the base axis 20, in order to allow a clear view of an object to be gripped.

The invention claimed is:

1. Handling device for handling objects, comprising
a base unit which extends overall in an elongate manner along a base axis from a first end to a second end, a flange portion being arranged at the first end for fastening the handling device to a robot arm and a pivot unit having a pivot portion being arranged at the second end, the pivot portion being mounted so as to be pivotable about a pivot axis by means of a pivot joint, the base unit having a pneumatic cylinder for pivoting the pivot portion about the pivot axis; and
a pneumatically activated end effector for gripping an object, the end effector being couplable or coupled to the pivot portion;
characterized in that
the base unit comprises an integrated negative-pressure generator and is constructed as a structural unit with its own module housing, the module housing being designed to extend in an elongate manner along the base axis and surrounding the pneumatic cylinder and the negative-pressure generator, wherein a negative-pressure guide is provided which is designed to conduct negative pressure from the negative-pressure generator to the end effector and the negative-pressure guide leads through the pivot joint.

2. Handling device according to claim 1, wherein the pivot joint comprises a hollow shaft having at least one first fluid opening and at least one second fluid opening, wherein the at least one first fluid opening is fluidically connected to a fluid channel which leads to the negative-pressure generator, and wherein the at least one second fluid opening is fluidically connected to a fluid channel on the pivot portion side.

3. Handling device according to claim 1, wherein the pivot unit is designed as a structural unit provided separately from the base unit, comprising a connection portion which can be connected to the module housing of the base unit and on which the pivot portion is pivotally mounted, wherein the connection portion comprises at least one fluid interface for connection to a fluid interface arranged on the module housing of the base unit.

4. Handling device according to claim 1, wherein the flange portion has at least one pneumatic supply connection for connection to an external fluid supply.

5. Handling device according to claim 4, wherein the flange portion has at least one positive-pressure supply connection and wherein a positive-pressure duct is provided which is designed to supply positive pressure from at least one positive-pressure supply connection of the flange portion (26) to the end effector.

6. Handling device according to claim 1, further comprising a coupling means by means of which the end effector can be detachably coupled to the pivot portion along a coupling axis.

7. Handling device according to claim 6, wherein the coupling means is designed to establish both a negative-pressure fluid connection and a positive-pressure fluid connection between the end effector and the pivot portion.

8. Handling device according to claim 7, wherein the pivot portion has a negative-pressure outlet and a positive-pressure outlet on a coupling side and wherein the end effector has a negative-pressure inlet and/or a positive-pressure inlet on a corresponding counter coupling side, wherein the negative-pressure outlet and the negative-pressure inlet or the positive-pressure outlet and the positive-pressure inlet are designed and arranged such that the negative-pressure outlet and the negative-pressure inlet, and/or the positive-pressure outlet and the positive-pressure inlet, form a fluid connection when the end effector is fastened to the pivot portion.

9. Handling device according to claim 8, wherein the negative-pressure outlet and/or the negative-pressure inlet or the positive-pressure outlet and/or the positive-pressure inlet each open out with an opening cross section in the coupling side or counter coupling side, wherein the opening cross section is extended rotationally symmetrically around the coupling axis in the manner of a ring or ring portion.

10. Handling device according to claim 6, wherein the coupling means is designed in such a way that it is effective for coupling the end effector in several predetermined rotational orientations of the end effector about the coupling axis relative to the pivot portion.

11. Handling device according to claim 6, wherein an anti-rotation means is provided which is effective between the pivot portion and the end effector and is designed to prevent rotation about the coupling axis.

12. Handling device according to claim 11, wherein the anti-rotation means has a first anti-rotation portion arranged on the pivot portion and a second anti-rotation portion arranged on the end effector, wherein the first or the second anti-rotation portion has a plurality of recesses which are arranged so as to be offset from one another along a circumference around the coupling axis, and wherein the second or the first anti-rotation portion has at least one protrusion, wherein the at least one protrusion defines a rotational orientation of the end effector about the coupling axis relative to the pivot portion can be engaged in different recesses.

13. Handling device according to claim 1, wherein the base unit has at least one of the following additional features:
   a) the base unit further comprises a ventilation valve fluidically connected to the end effector;
   b) the base unit further comprises a valve means which is designed to control a supply of negative or positive pressure to the handling device.

14. Handling device according to claim 1, further comprising a camera module which is arranged on the base unit and has at least one camera which is designed to identify the position and location of an object to be gripped.

15. Handling device for handling objects, comprising
   a base unit which extends overall in an elongate manner along a base axis from a first end to a second end, a flange portion being arranged at the first end for fastening the handling device to a robot arm and a pivot unit having a pivot portion being arranged at the second end, the pivot portion being mounted so as to be pivotable about a pivot axis by means of a pivot joint, the base unit having a pneumatic cylinder for pivoting the pivot portion about the pivot axis; and
   a pneumatically activated end effector for gripping an object, the end effector being couplable or coupled to the pivot portion;
   characterized in that
   the base unit comprises an integrated negative-pressure generator and is constructed as a structural unit with its own module housing, the module housing being designed to extend in an elongate manner along the base axis and surrounding the pneumatic cylinder and the negative-pressure generator, wherein the pivot unit is designed as a structural unit provided separately from the base unit, comprising a connection portion which can be connected to the module housing of the base unit and on which the pivot portion is pivotally mounted, wherein the connection portion comprises at least one fluid interface for connection to a fluid interface arranged on the module housing of the base unit.

16. Handling device for handling objects, comprising
   a base unit which extends overall in an elongate manner along a base axis from a first end to a second end, a flange portion being arranged at the first end for fastening the handling device to a robot arm and a pivot unit having a pivot portion being arranged at the second end, the pivot portion being mounted so as to be pivotable about a pivot axis by means of a pivot joint, the base unit having a pneumatic cylinder for pivoting the pivot portion about the pivot axis; and
   a pneumatically activated end effector for gripping an object, the end effector being couplable or coupled to the pivot portion;
   characterized in that
   the base unit comprises an integrated negative-pressure generator and is constructed as a structural unit with its own module housing, the module housing being designed to extend in an elongate manner along the base axis and surrounding the pneumatic cylinder and the negative-pressure generator, wherein the flange portion has at least one pneumatic supply connection for connection to an external fluid supply, wherein the flange portion has at least one positive-pressure supply connection and wherein a positive-pressure duct is provided which is designed to supply positive pressure from at least one positive-pressure supply connection of the flange portion to the end effector.

17. Handling device for handling objects, comprising
   a base unit which extends overall in an elongate manner along a base axis from a first end to a second end, a flange portion being arranged at the first end for fastening the handling device to a robot arm and a pivot unit having a pivot portion being arranged at the second end, the pivot portion being mounted so as to be pivotable about a pivot axis by means of a pivot joint, the base unit having a pneumatic cylinder for pivoting the pivot portion about the pivot axis; and
   a pneumatically activated end effector for gripping an object, the end effector being couplable or coupled to the pivot portion;
   characterized in that
   the base unit comprises an integrated negative-pressure generator and is constructed as a structural unit with its own module housing, the module housing being designed to extend in an elongate manner along the base axis and surrounding the pneumatic cylinder and the negative-pressure generator,
   a coupling means by means of which the end effector can be detachably coupled to the pivot portion along a coupling axis, wherein the coupling means is designed to establish both a negative-pressure fluid connection and a positive-pressure fluid connection between the end effector and the pivot portion.

* * * * *